US 8,611,365 B2

(12) United States Patent
Diab et al.

(10) Patent No.: US 8,611,365 B2
(45) Date of Patent: *Dec. 17, 2013

(54) METHOD AND SYSTEM FOR TRAINING AN ETHERNET CHANNEL BASED ON AN ACTIVE CHANNEL TO SUPPORT ENERGY EFFICIENT ETHERNET NETWORKS

(75) Inventors: Wael William Diab, San Francisco, CA (US); Howard Frazier, Pleasanton, CA (US); Scott Powell, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 671 days.

This patent is subject to a terminal disclaimer.

(21) Appl. No.: 12/042,139

(22) Filed: Mar. 4, 2008

(65) Prior Publication Data

US 2009/0097389 A1    Apr. 16, 2009

Related U.S. Application Data (63) Continuation-in-part of application No. 11/859,429, filed on Sep. 21, 2007, now Pat. No. 8,218,567.

(60) Provisional application No. 60/894,240, filed on Mar. 12, 2007, provisional application No. 60/917,870, filed on May 14, 2007, provisional application No. 60/979,433, filed on Oct. 12, 2007.

(51) Int. Cl.
*H04J 3/16* (2006.01)
*H04L 5/00* (2006.01)

(52) U.S. Cl.
CPC ................................ *H04L 5/0007* (2013.01)
USPC ........................................................ 370/437

(58) Field of Classification Search
USPC ........................................................ 370/437
See application file for complete search history.

(56) References Cited

U.S. PATENT DOCUMENTS

| | | | |
|---|---|---|---|
| 6,049,528 A * | 4/2000 | Hendel et al. ................. 370/235 |
| 6,591,303 B1 * | 7/2003 | Hendel et al. ................. 709/238 |
| 6,795,450 B1 | 9/2004 | Mills et al. |
| 7,242,762 B2 * | 7/2007 | He et al. .................... 379/406.08 |
| 2001/0043568 A1 * | 11/2001 | McHale et al. ............... 370/254 |
| 2004/0001450 A1 * | 1/2004 | He et al. ........................ 370/286 |
| 2006/0034295 A1 * | 2/2006 | Cherukuri et al. ........ 370/395.52 |
| 2007/0280239 A1 | 12/2007 | Lund |
| 2008/0134165 A1 * | 6/2008 | Anderson et al. ............. 717/173 |
| 2008/0225881 A1 * | 9/2008 | Powell .......................... 370/463 |
| 2009/0097390 A1 * | 4/2009 | Diab et al. .................... 370/201 |
| 2009/0097391 A1 * | 4/2009 | Diab et al. .................... 370/201 |
| 2009/0097393 A1 * | 4/2009 | Diab et al. .................... 370/201 |
| 2009/0125735 A1 | 5/2009 | Zimmerman |

* cited by examiner

*Primary Examiner* — Mark Rinehart
*Assistant Examiner* — Matthew Hopkins
(74) *Attorney, Agent, or Firm* — Duane S. Kobayashi (57) ABSTRACT

An Ethernet link may comprise silent and active channels and may support energy efficient Ethernet communication. Training parameters from the one or more active channels may be utilized for determining and/or adjusting training parameters for silent channels prior to activation. Training parameters for silent channels may be determined based on copying training parameters from active channels. Determination of training parameters for silent channels may be based on a weighted average of the active channel training parameters. A delta between active channel training parameters from a prior time and subsequent time may be utilized to determine a correction factor for adjusting training parameters for a silent channel from a prior time. Silent channels may be adjusted based on active channel training parameters and then subsequently may be trained. Training parameters may be adjusted for one or more of an echo canceller, a near-end crosstalk canceller and a far-end canceller.

6 Claims, 4 Drawing Sheets

METHOD AND SYSTEM FOR TRAINING AN ETHERNET CHANNEL BASED ON AN ACTIVE CHANNEL TO SUPPORT ENERGY EFFICIENT ETHERNET NETWORKS

CROSS-REFERENCE TO RELATED APPLICATIONS/INCORPORATION BY REFERENCE

The present application is a continuation-in-part of application Ser. No. 11/859,429, filed on Sep. 21, 2007, which claims the benefit of and priority to provisional application Ser. No. 60/894,240, filed on Mar. 12, 2007 and provisional application Ser. No. 60/917,870, filed on May 14, 2007.

This application makes reference to and claims priority to U.S. Provisional Application Ser. No. 60/979,433, filed on Oct. 12, 2007, entitled "Method and System for Energy Efficient Ethernet," which is hereby incorporated herein by reference in its entirety.

This application also makes reference to:
U.S. patent application Ser. No. 12/042,152 which was filed on Mar. 4, 2008;
U.S. patent application Ser. No. 12/049,000 which was filed on Mar. 14, 2008;
U.S. patent application Ser. No. 12/195,199 which was filed on Aug. 20, 2008;
U.S. patent application Ser. No. 12/107,434 which was filed on Apr. 22, 2008;
U.S. patent application Ser. No. 12/049,015 which was filed on Mar. 14, 2008; and
U.S. patent application Ser. No. 12/235,410 which was filed on Sep. 22, 2008.

Each of the above stated applications is hereby incorporated herein by reference in its entirety.

FIELD OF THE INVENTION

Certain embodiments of the invention relate to networking. More specifically, certain embodiments of the invention relate to a method and system for training an Ethernet channel based on an active channel to support energy efficient Ethernet networks.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often result in significant increases in power consumption. In this regard, as an increasing number of portable and/or handheld devices are enabled for Ethernet communications, battery life may be a concern when communicating over Ethernet networks. Accordingly, reducing power consumption when communicating over Ethernet networks is becoming popular.

New transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for training an Ethernet channel based on an active channel to support energy efficient Ethernet networks, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for training an Ethernet channel based on an active channel to support energy efficient Ethernet networks. In various embodiments of the invention, an Ethernet link may comprise a plurality of channels wherein one or more of the channels may be active and one or more of the channels may be silent or in a lower power state. In this regard, silent or lower power channels may be activated according to traffic demand. Functionality within Ethernet link partners that may support transitioning between active channel states and lower power states may enable energy efficient Ethernet communication. During active and/or lower power operations Ethernet link partners may train and/or configure one or more parameters and/or circuits for one or more channels on an Ethernet link. For example, parameters and/or circuits may be adjusted to account for variable operating conditions such as type of cabling and/or length of cabling or for environmental conditions such as temperature and/or electromagnetic coupling. Communication via active channels may need to be interrupted while training activity is performed. Channels in a silent or lower power state may refresh parameters and/or circuits from time to time or prior to carrying traffic. Accordingly, parameters and/or circuits for one or more channels in a silent or lower energy state may be configured based on training parameters and/or circuits from one or more active channels for one or more of echo cancellers, near-end crosstalk cancellers and/or far-end crosstalk cancellers for example.

The silent channel training parameters may be determined based on a copy of active channel training parameters, a weighted average of active channel training parameters, and/or a delta between active channel training parameters at a prior time and the active channel training parameters at a subsequent time. In this regard, training parameters from the silent channels may be modified based on the delta between active channel training parameters at a prior time and the active channel training parameters at a subsequent time. For example, a correction factor for modifying the silent channel training parameters may be based on the delta between active channel training parameter from a prior time and the active channel training parameter at a subsequent time. The silent channel training parameters may be configured based on the active channel training parameters and may be subsequently trained. The training parameters may be configured for one or more of an echo cancellers, near-end crosstalk cancellers and/or far-end crosstalk cancellers for example.

Figure 1:
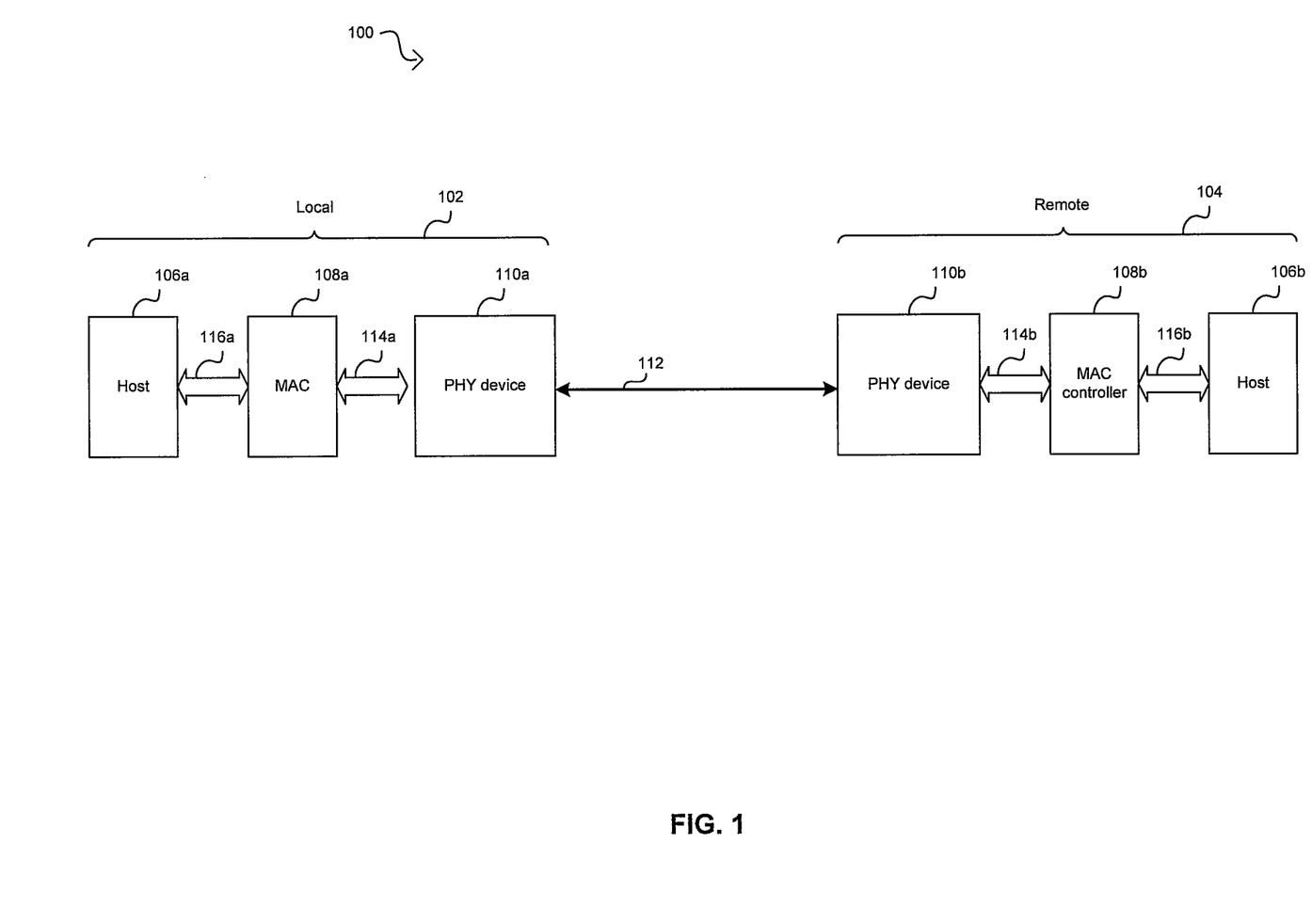
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. In an exemplary embodiment of the invention, the cable 112 may comprise up to four or more channels, each of which may, for example, comprise an unshielded twisted pair (UTP). The local link partner 102 and the remote link partner 104 may communicate via two or more channels comprising the cable 112. For example, Ethernet over twisted pair standards 10BASE-T and 100BASE-TX may utilize two pairs of UTP while Ethernet over twisted pair standards 1000BASE-T and 10 GBASE-T may utilize four pairs of UTP. In this regard, however, aspects of the invention may enable varying the number of physical channels via which data is communicated.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10GBASE-KX4 and/or 10GBASE-KR); and/or non-standard rates such as 2.5 Gbps and 5 Gbps.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY device s 110a and 110b may enable communications, such as 10 Mbps, 100 Mbps, 1000 Mbps (or 1 Gbps), 2.5 Gbps, 4 Gbps, 5 Gbps, 10 Gbps, 40 Gbps or 100 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high (er) data rate in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In addition, a change in rate such as stepping up in rate or stepping down in rate may occur asymmetrically among the PHY devices 110a and/or 110b which may support energy efficient Ethernet. For example, the PHY 110a may change rate based on a change of rate in 110b however, PHY 110a may change to a different rate than PHY 110b. Moreover, the PHY devices 110a and 110b may change rates independent of each other, for example, one PHY may change rate while the other does not change rate.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data, during inter frame gap (IFG)).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multirate interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of channels which may result in network links being underutilized for significant portions of time. When the link partners 102 and 104 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to and/or adjust various parameters and/or circuitry to account for variables such as the type of cabling over which data is being communicated and environmental conditions (e.g. temperature) surrounding the cabling. This process of configuring one or more circuits and/or parameters of an Ethernet channel may be referred to as "training". In this regard, "training" may adapt an Ethernet channel to current conditions such that functions such as echo cancellation, far-end crosstalk cancellation, and near-end crosstalk cancellation may be performed.

Training coefficients, parameters and/or circuitry may need to be periodically refreshed or retrained. For example, channels which have been inactive for a period of time may need to be "retrained" such that circuitry and/or parameters, which may become outdated over time, are refreshed in order to provide reliable data communications over the channel(s).

Figure 2:
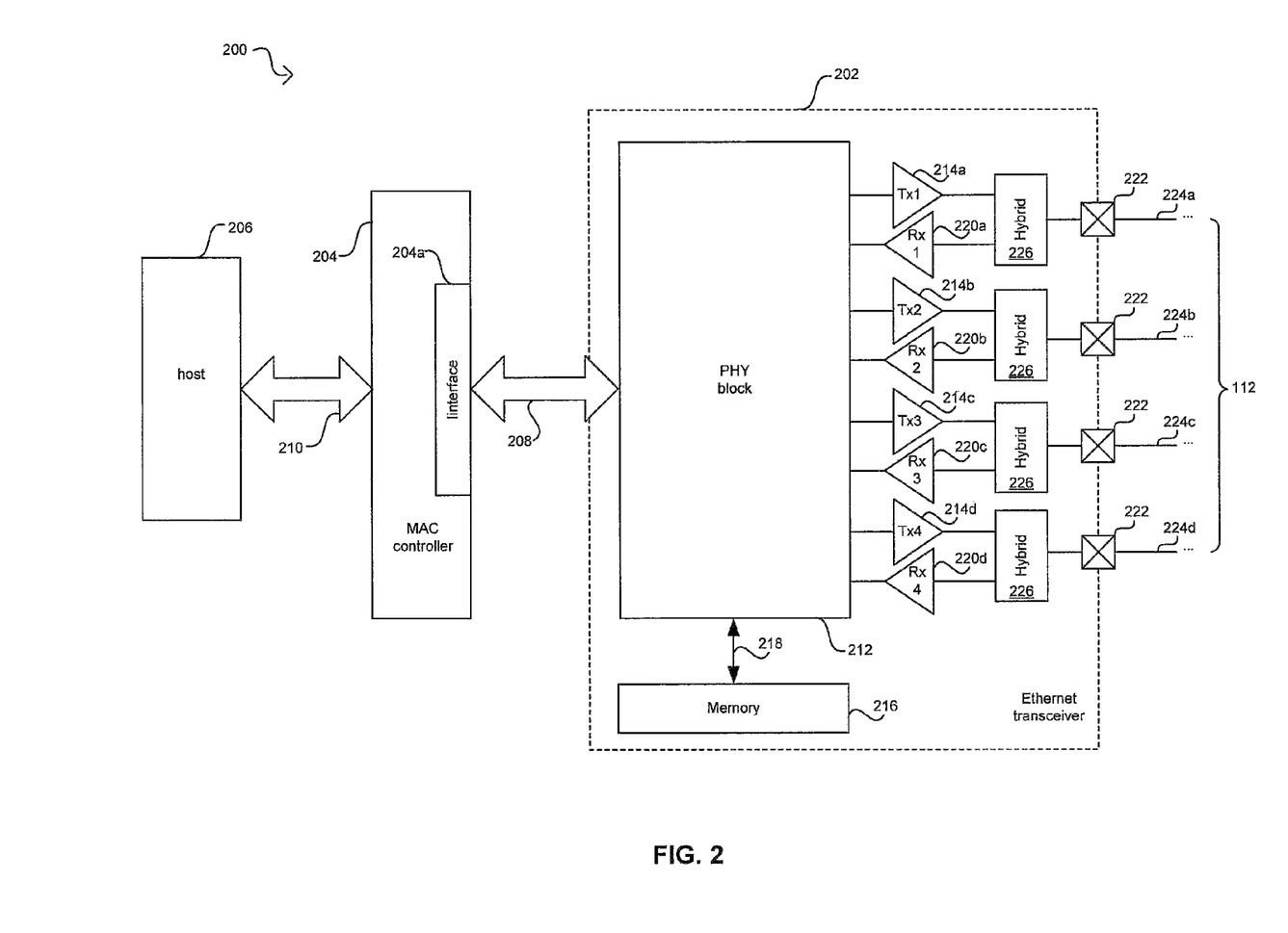
FIG. 2 is a block diagram illustrating an exemplary Ethernet over twisted pair PHY device architecture, in accordance with an embodiment of the invention.

FIG. 2 is a block diagram illustrating an exemplary Ethernet over twisted pair PHY device architecture, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a physical layer block 212, one or more transmitters 214, one or more receivers 220, a memory 216, a memory interface 218, one or more input/output interfaces 222 and channels 224.

The PHY device 202 may be an integrated device that may comprise a physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise an interface 204a that may comprise suitable logic, circuitry, and/or code to enable communication with the PHY device 202 via the interface 208.

The physical layer block 212 in the PHY device 202 may comprise suitable logic, circuitry, and/or code that may enable operability and/or functionality of physical layer requirements. In this regard, the physical layer block 212 may enable generating the appropriate link discovery signaling utilized for establishing communication with a remote PHY device in a remote link partner. The physical layer block 212 may communicate with the MAC controller 204 via the interface 208. In one aspect of the invention, the interface 208 may be a media independent interface (MII) and may be configured to utilize a plurality of serial data lanes for receiving data from the physical layer block 212 and/or for transmitting data to the physical layer block 212. The physical layer block 212 may be configured to operate in one or more of a plurality of communication modes, where each communication mode may implement a different communication protocol. These communication modes may include, but are not limited to, Ethernet over twisted pair standards 10BASE-T, 100Base-TX, 1000Base-T, 10GBase-T, and other similar protocols. The physical layer block 212 may be configured to operate in a particular mode of operation upon initialization or during operation. For example, auto-negotiation may utilize the FLP bursts to establish a rate (e.g. 10 Mbps, 100 Mbps, 100 Mbps, or 10 Gbps) and mode (half-duplex or full-duplex) for transmitting information.

The physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the physical layer block 212. The parameters may comprise configuration data and the code may comprise operational code such as software and/or firmware, but the information need not be limited in this regard. Moreover, the parameters may include adaptive filter and/or block coefficients for use by the physical layer block 212, for example.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a channel that may comprise the cable 112. In this manner, a transmitter/receiver pair may interface with each of the channels 224a, 224b, 224c, 224d.

The input/output interfaces 222 may comprise suitable logic circuitry, and/or code that may enable the PHY device 202 to impress signal information onto a physical medium comprising a channel, for example a twisted pair channel comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the local link partner 300 may be communicatively coupled to an input/output interface 222.

Due to the complex nature of the signal processing involved with full-duplex communication at high data rates, various components of the link partner 200 may be "trained" in order to provide reliable communications with a remote link partner. For example, the echo cancellers, FEXT cancellers, and/or NEXT cancellers may comprise one or more configuration parameters which may be determined based on factors comprising, for example, on environmental conditions, distance to the remote link partner, and data rate. Accordingly, these configuration parameters may need to be configured upon establishing a connection to a remote link partner. Moreover, these configuration parameters may need to be periodically refreshed due to for example, environmental changes. In the event that one or more links 224 may be inactive for some amount of time, environmental conditions may change and training coefficients and/or parameters may need to be updated prior to activating data traffic on the link.

Figure 3:
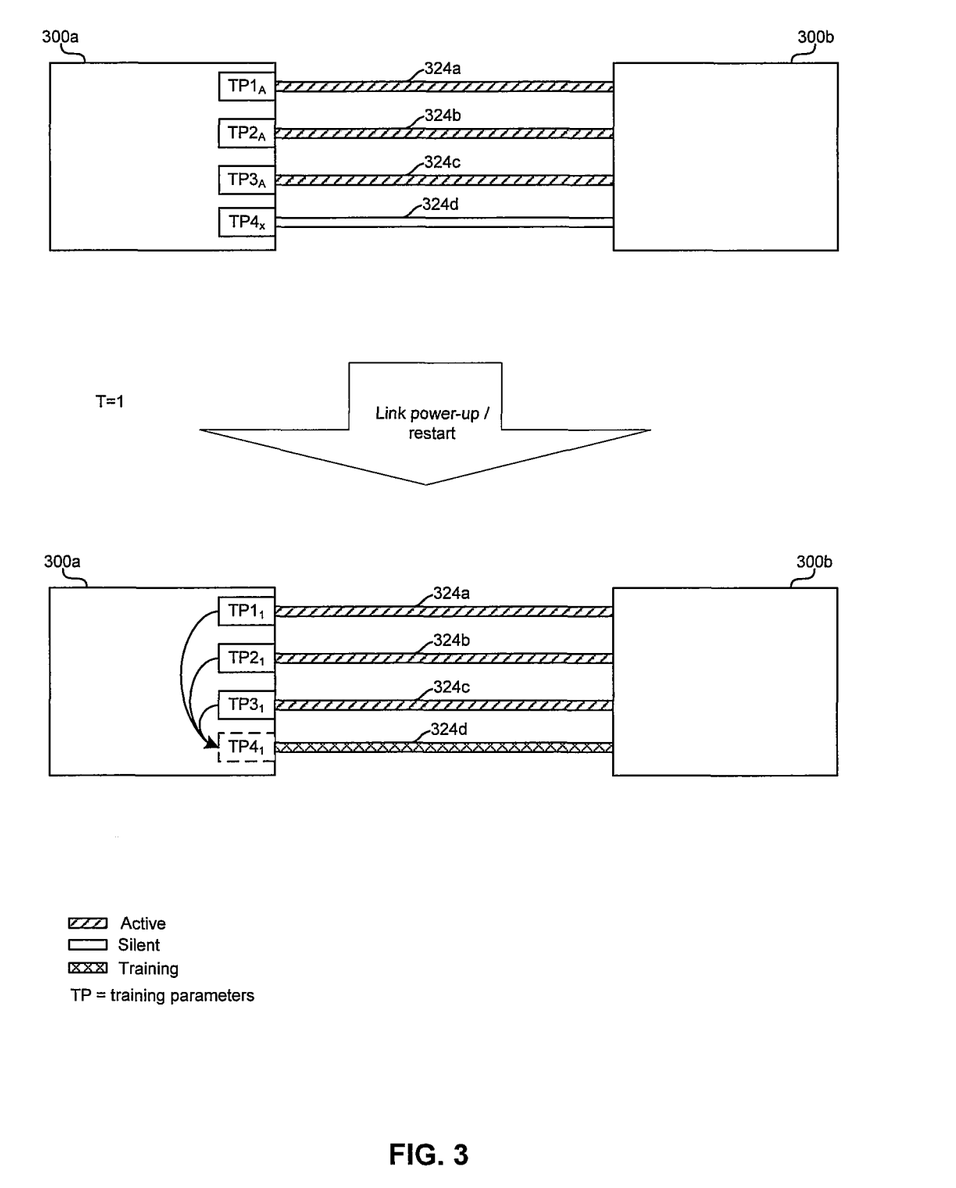
FIG. 3 is a block diagram illustrating training an Ethernet channel based on active channels, in accordance with an embodiment of the invention.

FIG. 3 is a block diagram illustrating training an Ethernet channel based on active channels, in accordance with an embodiment of the invention. Referring to FIG. 3 there is shown the link partners 300a and 300b which may communicate via one or more of the channels 324a, 324b, 324c, and 324d.

The link partners 300a and 300b may be similar or substantially the same as the link partner 200 described in FIG. 2 and the link partners 102 and 104 described in FIG. 1.

Referring to FIG. 3, prior to time instant T=1, the channels 324a, 324b, and 324c are active, and thus their respective training parameters, TP1, TP2, TP3 are valid. In this regard, an 'A' subscript indicates that TP1, TP2, and TP3 may be actively updated. On the other hand, prior to time instant T=1, the channel 324d is silent and the training parameters, TP4, may be invalid (as indicated by the 'x' subscript). At time instant T=1 the channel 324d may transition from a lower power state to a higher power state for full bandwidth communication. Accordingly, one or more of the training parameters TP11, TP21, and TP31, may be utilized to determine TP41. In an exemplary embodiment of the invention, one of TP11, TP21, and TP31 may be used for TP41. In another exemplary embodiment of the invention, a combination (e.g. a weighted average) of TP11, TP21, and/or TP31 may be utilized to determine TP41.

Although, the FIG. 3 depicts one channel being silent and subsequently becoming active, the invention is not so limited. In this regard, training parameters for any number of previously silent or low(er) power channels may be configured utilizing training parameters from at least one active channel. Also, channels may emerge from a lower power state and become active sequentially or in parallel. Additionally, in various embodiments of the invention, a shortened training period may follow an initialization of training parameters based on the training parameters of at least one active channel.

In operation, one or more channels 324 may be active and one or more channels 324 may become active from a silent or lower power state based on training information from the active channels and may avoid or reduce delay imposed by retraining. In this regard, when channels are silent, or placed into a low(er) power state, their coefficients and/or parameters configured during channel training may become stale or no longer applicable. When a channel becomes active, the channel may need to be "re-trained" in order to establish reliable communications between the link partners 300a and 300b via that channel. In some embodiments of the invention, the coefficients and/or parameters for one or more silent channels may be based on copies of coefficients from one or more active channels. In this regard, coefficients and/or parameters may be copied from one or more of the active channels to the one or more channels going from a silent or lower power state to an active state. For example, coefficients and/or parameters from one of 324a, 324b or 324c may be copied to channel 324d.

In other embodiments of the invention, coefficients and/or parameters from a plurality of active channels may be utilized to determine coefficients and/or parameters for one or more channels going from a silent or lower power state to a higher power state. For example, a weighted average of the active channel coefficients and/or parameters may be utilized. Moreover, in some embodiments of the invention, a delta between the coefficients and/or parameters on an active channel at a prior time and a subsequent time may be utilized as a correction factor to adjust the coefficients and/or parameters for a channel transitioning from a silent state to an active state. For example, coefficients and/or parameters from one or more of the active channels 324a, 324b and 324c may be recorded at or near the time when the channel 324d transitioned from active to silent (T=0) and again when the channel 324d is ready to transition from silent to active (T=1). The delta between the two measurements at T=0 and T=1 on the one or more active channels may be utilized as a correction factor in adjusting the coefficients and/or parameters for 324d that have may have not been refreshed since the time that 324d transitioned from active to silent at T=0. If parameters and/or circuits are not adequately updated, link partners may perform full training activity to enable transitioning a channel from a lower power state to a higher power state for carrying traffic. Full training activity may take on the order of 100 ms or seconds. In accordance with an embodiment of the invention, the time to transition from a lower power state to a higher power state may be reduced significantly since silent channels may not need to go through a full training cycle.

Figure 4:
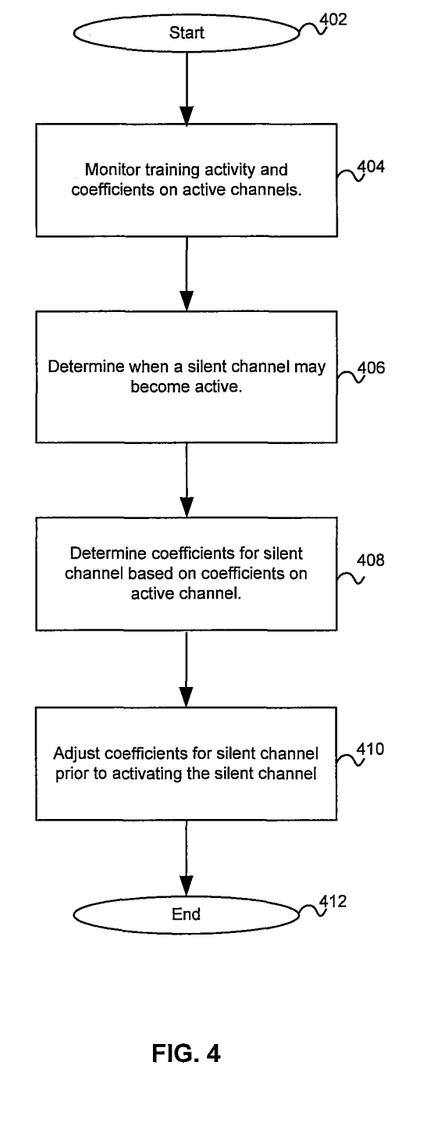
FIG. 4 is a flow chart illustrating exemplary steps for training an Ethernet channel based on an active channel, in accordance with an embodiment of the invention.

FIG. 4 is a flow chart illustrating exemplary steps for training an Ethernet channel based on an active channel, in accordance with an embodiment of the invention. Referring to FIG. 4, after start step 402, in step 404, coefficients on active channels 324a, 324b and/or 324c may be monitored or recorded. In step 406, the system 100 and/or 200 may determine when a silent channel 324d may become active. In step 408, the channel 324d coefficients and/or parameters may be determined based on the coefficients and or parameters on one or more of the active channels 324a, 324b and 324c. For example, coefficients or parameters from the active channel may be based on a copy of active channel training parameters, a weighted average of active channel training parameters, and/or a delta between active channel training parameters at a prior time and the active channel training parameters at a subsequent time. In step 410, the coefficients and/or parameters may be adjusted for the silent channels. The step 412 is an end step.

In an embodiment of the invention, an Ethernet link 112 may comprise a plurality of channels such as channels 224 and/or 324 wherein one or more channels may be silent and one or more channels may be active. In this regard, training parameters from the one or more active channels may be utilized for determining and/or configuring training parameters for the one or more silent channels. For example, training parameters from channels 324a, 324b and/or 324c may be utilized to determine and configure training parameters on silent channel 324d prior to activating channel 324d. Training parameters for one or more of the silent channels such as channel 324d may be determined based on copying training parameters from the one or more active channels such as 324a, 234b and 234c. Moreover, determination of training parameters for the one or more silent channels may be based on a weighted average of the active channel training parameters. In some embodiments of the invention, a delta between active channel training parameters from a prior time and subsequent time may be utilized to determine a correction factor for modifying training parameters for a silent channel from a prior time. In this regard, the silent channel may be configured with the modified prior time training parameters. In addition, silent channels may be configured based on active channel training parameters and then subsequently may be trained. Accordingly, training parameters may be configured for one or more of an echo canceller, a near-end crosstalk canceller and a far-end canceller, for example within one or more hybrid 226, corresponding to the Ethernet link 112.

Another embodiment of the invention may provide a machine-readable storage, having stored thereon, a computer program having at least one code section executable by a machine, thereby causing the machine to perform the steps as described herein for training an Ethernet channel based on an active channel to support energy efficient Ethernet networks.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in an Ethernet link comprising a plurality of channels and during a time period when one or more of a first subset of said plurality of channels is in a silent state and one or more of a second subset of said plurality of channels is in an active state, identifying a change in one or more training parameters for one or more of said second subset of said plurality of channels from a first point in time to a second point in time subsequent to said first point in time, said one or more training parameters being used to configure communication over said one or more of said second subset of said plurality of channels;

determining, based on said identified change in said one or more training parameters, an adjustment to one or more training parameters for one or more of said first subset of said plurality of channels;

adjusting said one or more training parameters for said one or more of said first subset of said plurality of channels based on said determined adjustment; and transitioning, at a point in time subsequent to said adjustment, said one or more of said first subset of said plurality of channels from said silent state to said active state.

2. The method according to claim 1, comprising adjusting said one or more training parameters for one or more of an echo canceller, a far-end crosstalk canceller, and a near-end crosstalk canceller corresponding to said Ethernet link.

3. A system for networking, the system comprising:

one or more circuits in one or more link partners that are coupled to an Ethernet link, said Ethernet link comprising a plurality of channels, said one or more circuits being operable to:

identify, during a time period when one or more of a first subset of said plurality of channels is in a silent state and one or more of a second subset of said plurality of channels is in an active state, a change in one or more training parameters for one or more of said second subset of said plurality of channels from a first point in time to a second point in time subsequent to said first point in time, said one or more training parameters being used to configure communication over said one or more of said second subset of said plurality of channels;

determine, based on said identified change in said one or more training parameters, an adjustment to one or more training parameters for one or more of said first subset of said plurality of channels;

adjust said one or more training parameters for said one or more of said first subset of said plurality of channels based on said determined adjustment; and transition, at a point in time subsequent to said adjustment, said one or more of said first subset of said plurality of channels from said silent state to said active state.

4. The system according to claim 3, wherein said one or more circuits enables adjustment of said one or more training parameters for one or more of an echo canceller, a far-end crosstalk canceller, and a near-end crosstalk canceller corresponding to said Ethernet link.

5. A non-transitory machine-readable storage having stored thereon, a computer program having at least one code section for networking, the at least one code section being executable by a machine for causing the machine to perform steps comprising:

in an Ethernet link comprising a plurality of channels, and during a time period when one or more of a first subset of said plurality of channels is in a silent state and one or more of a second subset of said plurality of channels is in an active state, identifying a change in one or more training parameters for one or more of said second subset of said plurality of channels from a first point in time to a second point in time subsequent to said first point in time, said one or more training parameters being used to configure communication over said one or more of said second subset of said plurality of channels;

determining, based on said identified change in said one or more training parameters, an adjustment to one or more training parameters for one or more of said first subset of said plurality of channels;

adjusting said one or more training parameters for said one or more of said first subset of said plurality of channels based on said determined adjustment; and transitioning, at a point in time subsequent to said adjustment, said one or more of said first subset of said plurality of channels from said silent state to said active state.

6. The non-transitory machine-readable storage according to claim 5, wherein said at least one code section comprises code for adjusting said one or more training parameters for one or more of an echo canceller, a far-end crosstalk canceller, and a near-end crosstalk canceller corresponding to said Ethernet link.

* * * * *